United States Patent
Ho et al.

(10) Patent No.: US 9,166,958 B2
(45) Date of Patent: Oct. 20, 2015

(54) ID-BASED CONTROL UNIT-KEY FOB PAIRING

(71) Applicant: TEXAS INSTRUMENTS INCORPORATED, Dallas, TX (US)

(72) Inventors: Jin-Meng Ho, Plano, TX (US); Eric Peeters, Frisco, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 148 days.

(21) Appl. No.: 13/942,381

(22) Filed: Jul. 15, 2013

(65) Prior Publication Data

US 2014/0025951 A1    Jan. 23, 2014

Related U.S. Application Data

(60) Provisional application No. 61/672,463, filed on Jul. 17, 2012, provisional application No. 61/672,474, filed on Jul. 17, 2012.

(51) Int. Cl.
| | |
|---|---|
| *H04W 12/06* | (2009.01) |
| *H04L 29/06* | (2006.01) |
| *H04W 12/04* | (2009.01) |

(52) U.S. Cl.
CPC .......... *H04L 63/0428* (2013.01); *H04L 63/061* (2013.01); *H04W 12/04* (2013.01)

(58) Field of Classification Search
CPC ......... G08G 1/205; H04L 63/08; H04L 63/10
USPC ........................... 713/168, 153, 171, 176, 181
See application file for complete search history.

(56) References Cited

U.S. PATENT DOCUMENTS

| | | | |
|---|---|---|---|
| 8,473,153 B1* | 6/2013 | Lickfelt | 701/36 |
| 8,659,414 B1* | 2/2014 | Schuk | 340/457 |
| 8,933,782 B2* | 1/2015 | Pierfelice et al. | 340/5.83 |
| 2005/0273629 A1* | 12/2005 | Abrams et al. | 713/189 |
| 2007/0200671 A1 | 8/2007 | Kelley et al. | |
| 2008/0059806 A1 | 3/2008 | Kishida et al. | |
| 2009/0203349 A1* | 8/2009 | Hollstien | 455/404.1 |
| 2009/0284345 A1* | 11/2009 | Ghabra et al. | 340/5.61 |
| 2010/0280635 A1* | 11/2010 | Cohn et al. | 700/90 |
| 2011/0018736 A1* | 1/2011 | Carr | 340/902 |
| 2011/0102146 A1* | 5/2011 | Giron | 340/7.62 |
| 2011/0181111 A1* | 7/2011 | Walley et al. | 307/31 |
| 2011/0314153 A1* | 12/2011 | Bathiche et al. | 709/225 |
| 2012/0062358 A1* | 3/2012 | Nowottnick | 340/5.2 |
| 2012/0071140 A1* | 3/2012 | Oesterling et al. | 455/414.1 |
| 2012/0158244 A1* | 6/2012 | Talty et al. | 701/36 |
| 2012/0179323 A1* | 7/2012 | Profitt-Brown et al. | 701/29.1 |
| 2012/0252365 A1* | 10/2012 | Lam | 455/41.2 |
| 2012/0322380 A1* | 12/2012 | Nannarone et al. | 455/41.2 |

FOREIGN PATENT DOCUMENTS

| | | | |
|---|---|---|---|
| JP | 2008312213 A | 12/2008 | |
| JP | 2009135688 A | 6/2009 | |
| JP | 2011228777 A | 11/2011 | |

\* cited by examiner

*Primary Examiner* — Haresh N Patel
(74) *Attorney, Agent, or Firm* — Steven A. Shaw; Charles A. Brill; Frank D. Cimino

(57) ABSTRACT

A key fob-control unit pairing device that includes a transceiver to transmit and receive signals, a memory to store a key fob identification (KFID) and a control unit identification (CUID), and a processor coupled to said transceiver and memory. The processor is to authenticate the key fob using identification (ID) authenticated key agreement protocol based on the KFID, and to transmit an encrypted CUID to the key fob.

6 Claims, 5 Drawing Sheets

ID-BASED CONTROL UNIT-KEY FOB PAIRING

CROSS-REFERENCE TO RELATED APPLICATION

The present application claims priority to U.S. Provisional Patent Application No. 61/672,463, filed on Jul. 17, 2012 and U.S. Provisional Patent Application No. 61/672,474, filed on Jul. 17, 2012; which is hereby incorporated herein by reference.

BACKGROUND

Wireless key fobs and their respective vehicles may use encrypted operational keys to authenticate communications that occur between the two. For the key fob and the vehicle to be able to communicate, they must be paired at some point in either the manufacturing or the sales process. The pairing of wireless key fobs and their respective vehicles conventionally requires the vehicle manufacturer to deliver to the various vehicle dealers a secret key associated with each key fob where the secret key is a cryptographic key. A key fob's secret key may be then be used to associate the key fob with a vehicle, or pair the key fob and the vehicle. Multiple key fobs are typically paired with each vehicle. This step of delivering to the vehicle dealers the secret key may and the fact that each of these key fobs must store the secret key, however, open a means for theft of the secret key leading to unauthorized key fobs and potential theft.

SUMMARY

The problems noted above are solved in large part by a key fob-control unit pairing device that includes a transceiver to transmit and receive signals, a memory to store a key fob identification (KFID) and a control unit identification (CUID), and a processor coupled to said transceiver and memory. The processor is to authenticate the key fob using identification (ID) authenticated key agreement protocol based on the KFID, and to transmit an encrypted CUID to the key fob.

The solution to the problem may also involve a key fob that includes a transceiver to receive and send signals, a memory to store a key fob identification (KFID), and a processor coupled to said transceiver and memory. The processor is to execute, along with a pairing device, identification (ID) authenticated key agreement protocol based on the KFID to authenticate the pairing device and to generate a common secret encryption key known only by the processor and the pairing device. The processor is also to receive, from the pairing device, a control unit identification (CUID) encrypted by the pairing device with the common secret encryption key, is to execute, along with the control unit associated with the CUID, an (ID) authenticated key agreement protocol based on the CUID to authenticate the control unit and to generate a second common secret encryption key known only by the processor and the control unit, and is to receive, from the control unit, an operation key encrypted by the control unit with the second common secret encryption key.

And yet another solution may be a method for pairing a key fob with a vehicle that includes executing, by a pairing device and a key fob, an (ID) authenticated key agreement protocol based on the KFID to authenticate one another and to generate an encryption key DHKey1, encrypting, by the pairing device, a control unit identification (CUID) with DHKey1, transmitting, by the pairing device, the encrypted CUID to a key fob, executing, by the key fob and a control unit, an (ID) authenticated key agreement protocol based on the CUID to authenticate one another and to generate an encryption key DHKey2, encrypting, by the control unit, an operation key with DHKey2, and transmitting, by the control unit, the encrypted operation key to the key fob.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
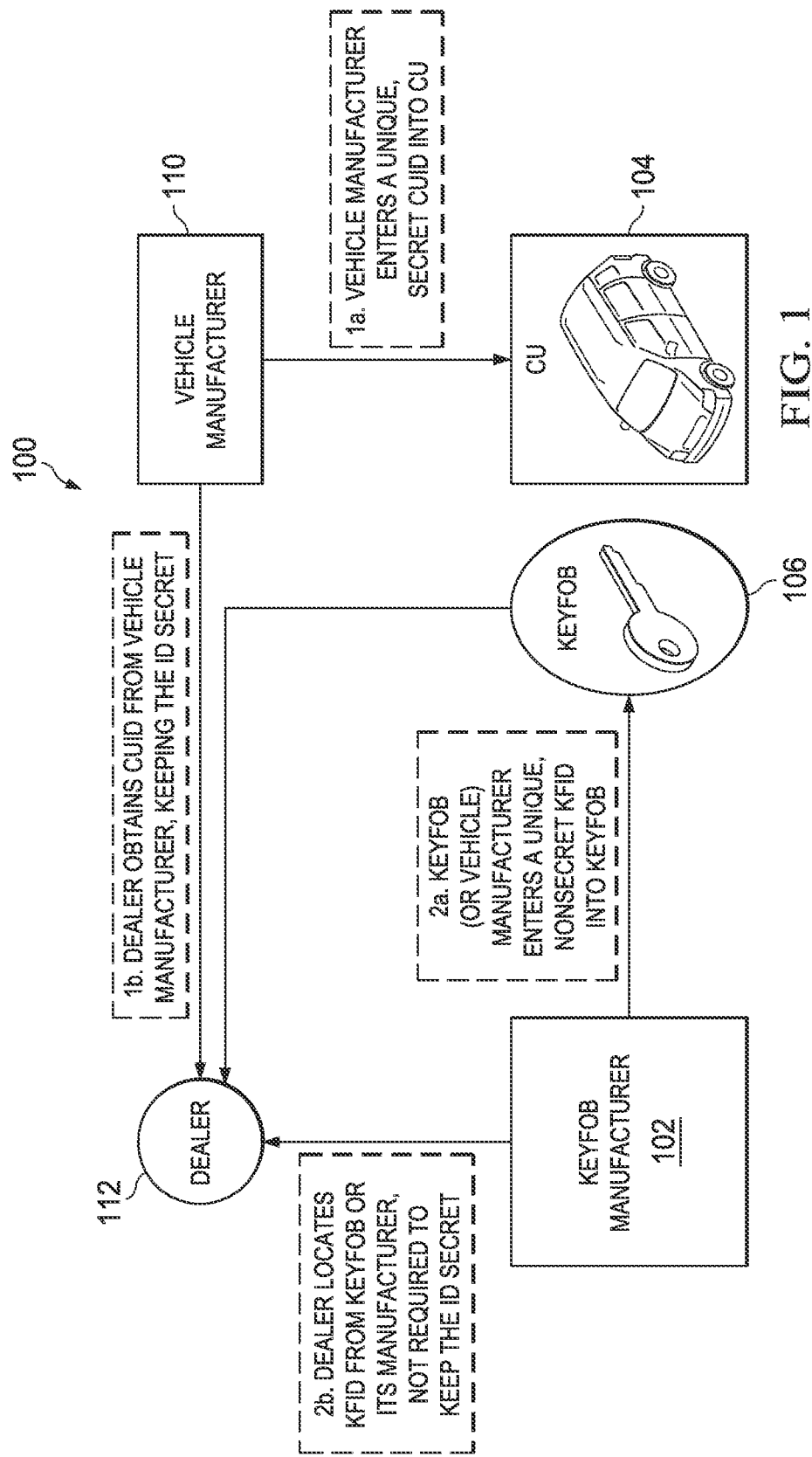
FIG. 1 is an example conditioning process for identification (ID)-based authentication pairing approach in accordance with various examples discussed herein.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct wired or wireless connection, or through an indirect wired or wireless connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The pairing of key fobs and vehicles (e.g., automobiles, motorcycles, boats, scooters, etc.) may entail the transport and use of secure information to ensure imposter key fobs are not paired with vehicles, which may lead to theft. The full conventional process may be kept secret by vehicle manufacturers to ensure the security of their vehicles. This process, however, may require the manufacturer to develop an expensive and dedicated IT system to generate secret keys and to maintain their security. Yet, when vehicles are delivered to dealerships, the secret keys are passed along so that multiple key fobs may be paired at the final destination. The transportation of the secret keys from manufacturer to dealer may present an opportunity for the secret keys to be stolen leading to rogue and imposter key fobs.

In addition to vehicles, the disclosed methods may also be used to pair a key fob with any type of control unit that allows for wireless connectivity and control. For instance, the disclosed techniques and devices may be part of a garage door system, hotel entrance system, or a remote entry for a home. As such, the scope of this disclosure is not limited to control units of vehicles. The use of vehicles and the pairing of key fobs with one or all the control units of a vehicle is mainly for descriptive purposes.

Disclosed herein are devices and methods for pairing key fobs with vehicles that may avoid the transport of the secret information to the dealerships and that may reduce the IT requirements of the vehicle manufacturers. One method to effectuate the pairing of a key fob and a control unit may involve identification (ID) authenticated key agreement protocol with the ID serving as a password for authentication purposes. With the ID-based authentication approach, the key fob and the control unit may both have their own unique associated ID. The IDs may then be used in the key agreement protocol to generate common secret encryption keys that may be used to pass information between the devices so the key fob and the control unit are paired. A pairing device may first generate a secret key with a key fob using the key fob's ID. The secret key may then be used by the pairing device for encrypting the ID of a control unit. The encrypted control unit ID may then be transmitted to the key fob so the key fob knows what control unit with which to pair. The key fob and the control unit may then use the control unit ID to generate a second secret key only known to them. The second secret key may then be used by the control unit to encrypt an operational key, which will be transmitted to the key fob to complete the pairing process.

The ID authenticated key agreement protocol with the ID serving as the password for authentication may be based on elliptical curve cryptography (ECC), such as elliptical curve Diffie-Hellman key agreement protocols.

A possible advantage of the ID-based technique is that it may not require a costly public key infrastructure and a certificate authority.

FIG. 1 is an example conditioning process 100 for identification (ID)-based authentication pairing approach in accordance with various examples discussed herein. The conditioning process 100 may prime the key fobs and the CUs so to facilitate pairing of the two. The conditioning process may involve a vehicle dealer 112, a vehicle manufacturer 110, a key fob 106106 and a CU 104104. Alternatively, the vehicle dealer 112's part in the conditioning process 100 may occur when the key fob and CU are paired and does not necessarily need to be performed as shown in FIG. 1. The conditioning process 100 may involve inserting a unique ID into the CU 104 (CUID) and the key fob 106106 (KFID). The unique ID for the CU 104104 may be kept secret and may be inserted into the CU 104104 by the vehicle manufacturer 110 or a CU 104104 supplier to the vehicle manufacturer 110. The unique IDs for both the key fobs and the CUs may be an eight character hexadecimal word, for example. Alternatively, the ID may be based on a system that allows for a large number of permutations to avoid redundancy within the IDs used. The IDs may be selected such that an imposter/adversary is unable to predict which key fob 106 (and its associated KFID) the dealer 112 may use in the next pairing. An eight character hexadecimal ID would generate around 4 billion possibilities.

The vehicle manufacturer 110 may send the CUIDs of associated CU 104104s to the vehicle dealership 112 receiving the vehicles that include those CU 104104s. The transfer of the CUIDs to the dealer 112 should be performed such that the CUIDs are kept secret. Intercepted CUIDs may allow imposter key fobs to be generated that may be paired to CUs without the aid of the dealer 112, possibly leading to theft.

The key fobs 106 may have their unique ID (KFID), which does not have to be kept secret and is readable from the key fob 106, inserted by the key fob manufacturer 102, a key fob assembler, or the vehicle manufacturer 110.

Figure 2:
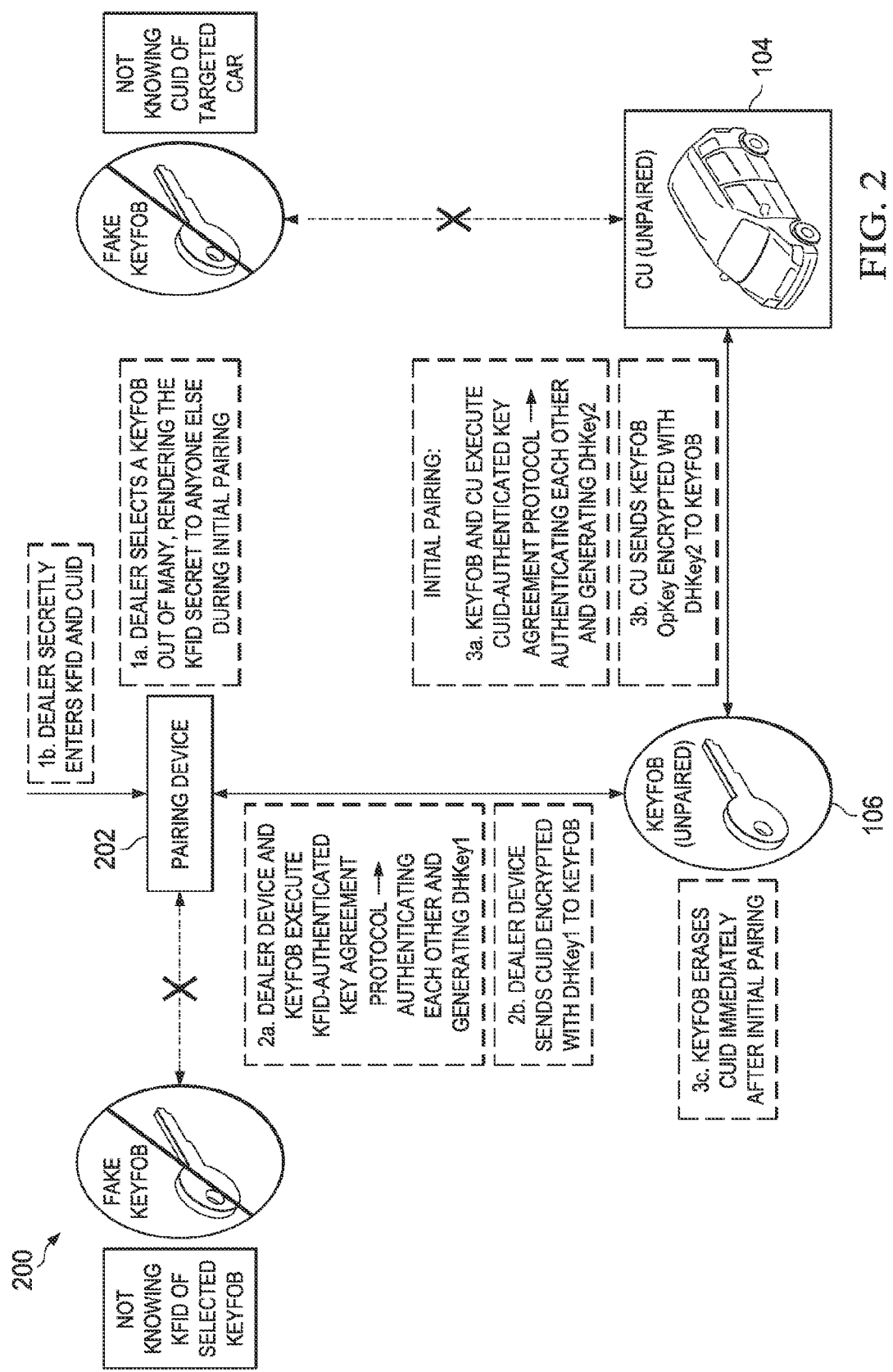
FIG. 2 is an example initial pairing process of a key fob and a control unit using ID-based authentication and in accordance with various examples discussed herein.

FIG. 2 is an example initial pairing process 200 of a key fob and a control unit using ID-based authentication and in accordance with various examples discussed herein. The initial pairing 200 may involve the pairing device 202 (at the dealer 112), the key fob 106, and the CU 104. Similar to the certificate-based authentication approach discussed above, the pairing device 202 may facilitate the pairing of the key fob 106 and the CU 104 by securely transferring identification information to one of the components to use to connect to the other component.

The pairing process 200 may begin at step 1a with the dealer 112 selecting one key fob 106 out of the many in inventory. Upon selection and through the pairing process, the KFID of the key fob 106 should be kept secret. The dealer 112 may then, step 1b, secretly enter the KFID of the associated key fob 106 and the CUID of a CU 104 into the pairing device 202.

The pairing device 202 may then establish communication with the key fob 106, step 2a. Using the KFID, the pairing device and the key fob 106 may then execute an ID authenticated key agreement protocol with the ID serving as a password for authentication purposes. The ID authenticated key agreement protocol may perform two functions: authenticating the two components to each other and generating a common secret key they two components may use to transmit encrypted messages between one another. Thus, when the pairing device 202 and the key fob perform the ID authenticated key agreement protocol using the KFID, they will authenticate one another and they will generate a common secret key, DHKey1, to use for secure communications with one another. At step 2b, the pairing device 202 may encrypt the CUID using the DHKey1 and transmit the encrypted CUID to the key fob 106.

The key fob 106 may be able to decrypt the message to obtain the CUID, which may then be used to establish communication with the CU 104 associated with the received CUID. At step 3a, the key fob 106 and the CU 104 may then execute an ID-based encryption authentication using the CUID, similar to above, to both authenticate one another and to generate a common secret key, DHKey2. The CU 104 may then use the DHKey2 to encrypt an OpKey to transmit to the key fob 106 at step 3b. Additionally or alternatively, the key fob 106 may erase the CUID after initial pairing with the CU 104.

Figure 3:
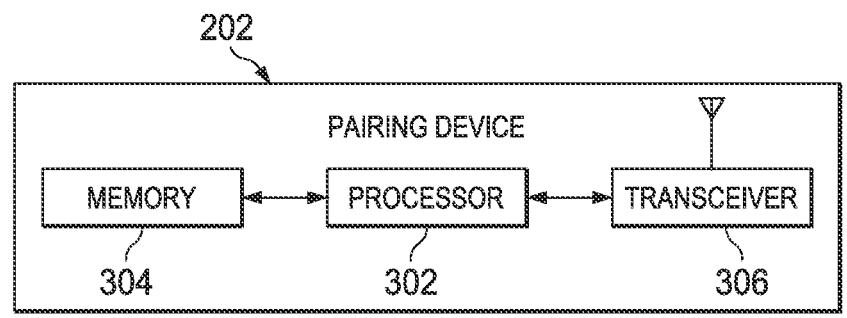
FIG. 3 is a block diagram of an example pairing device in accordance with various examples discussed herein.
Figure 4:
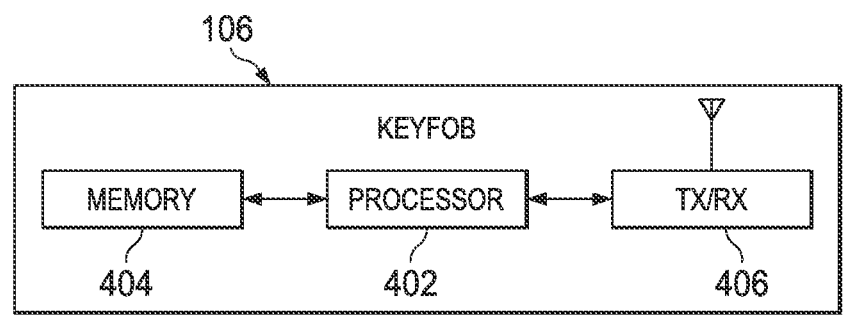
FIG. 4 is a block diagram of an example key fob in accordance with various examples discussed herein.
Figure 5:
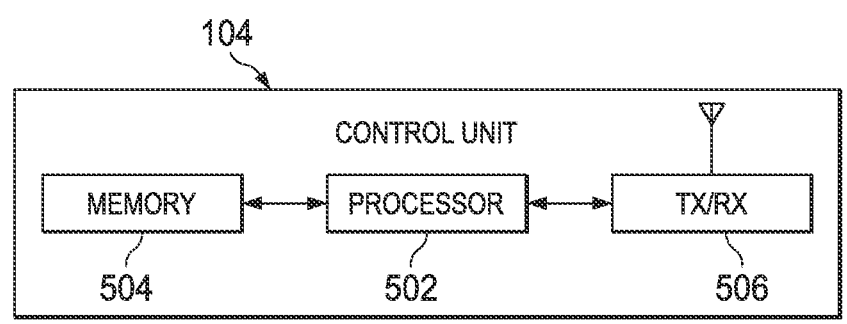
FIG. 5 is a block diagram of an example control unit in accordance with various examples discussed herein.

FIGS. 3, 4, and 5 show block diagrams of an example pairing device 202, key fob 106, and CU 104, respectively, in accordance with various examples discussed herein. The three devices/components—pairing device, key fob, and CU—may all comprise a processor (302, 4024, 502), a memory (304, 404, 504), and a transceiver (306, 406, 506). The processors of the three devices/components may be used to perform the authentication computations and the common secret key generation computations associated with the certificate-based authentication pairing and the ID-based authentication pairing. The processors may be a standard CPU, a microcontroller, a low-power digital signal processor, etc. and may be capable of performing complex calculations in a short time.

The memories of the three devices may be used to store the public and private key pairs and the certificates of authenticity associated with their respective device for the certificate-based authentication pairing. Alternatively or additionally, the memories of the three devices may be used to store the IDs of their own or the other devices. For example, in the ID-based authentication pairing, the pairing device 202 may store both the KFID and the CUID before initiating a paring sequence. The KFID and CUID for those two associated devices may be stored in the memory 304 of the pairing device 202. The memories may be a non-volatile storage device such as flash memory or an EEPROM.

The transceivers for the three devices may be wired (not shown), wireless or capable of both. The transceivers may be used by the devices to communicate the IDs, public keys, and/or certificates of authenticity during the condition steps and the initial pairing steps for either authentication approach. The key fobs allowing for remote entry and control of vehicles may use a wireless technology such as Bluetooth, LF, or UHF for those transmissions but may also be able to communicate with the pairing device and/or the CUs via a wire during the initial pairing process.

Figure 6:
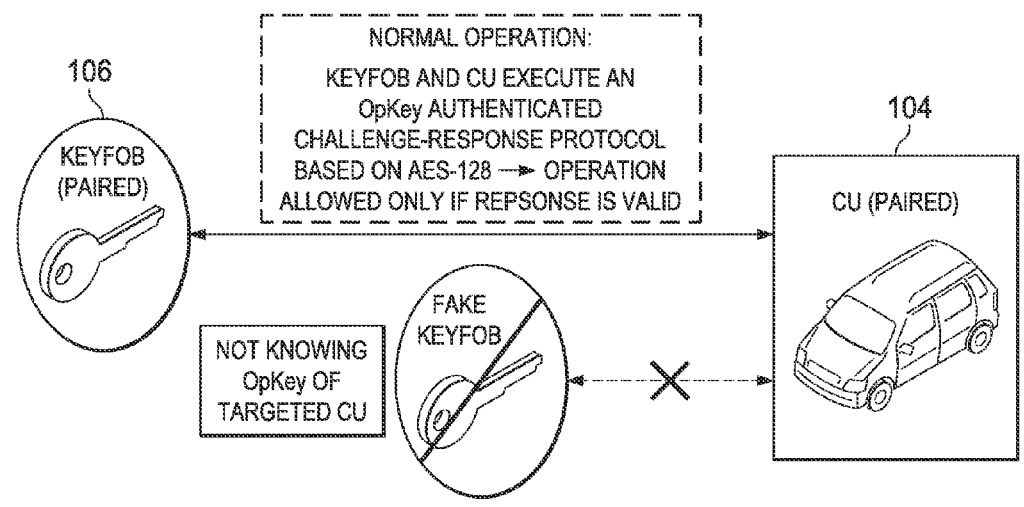
FIG. 6 shows an example operation of a paired key fob and control unit after pairing in accordance with various examples as discussed herein.
Figure 7:
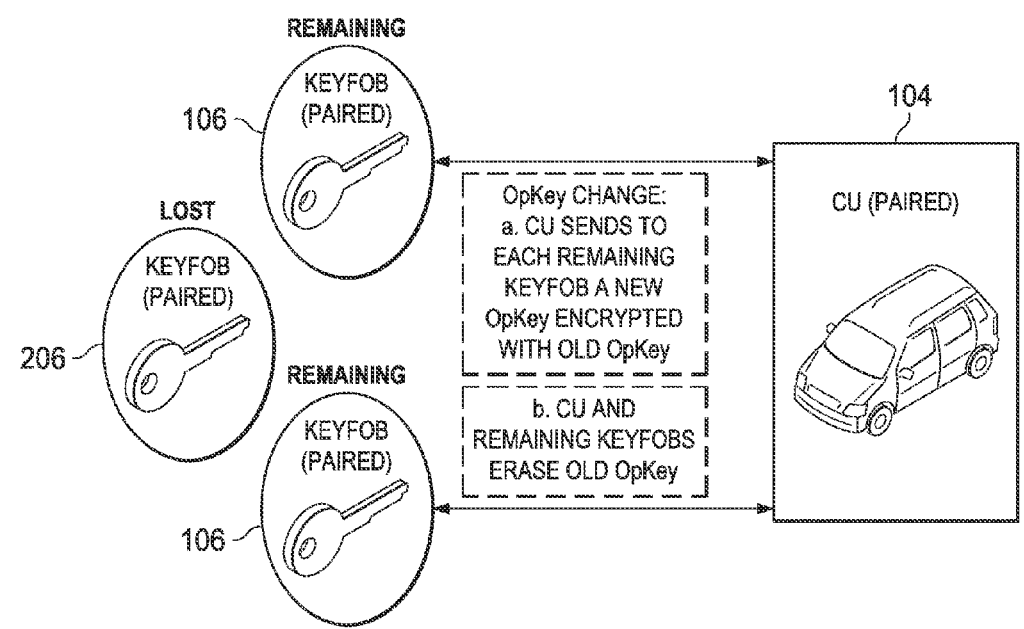
FIG. 7 shows an example of an operational key change by a CU in accordance with various examples as discussed herein.
Figure 8:
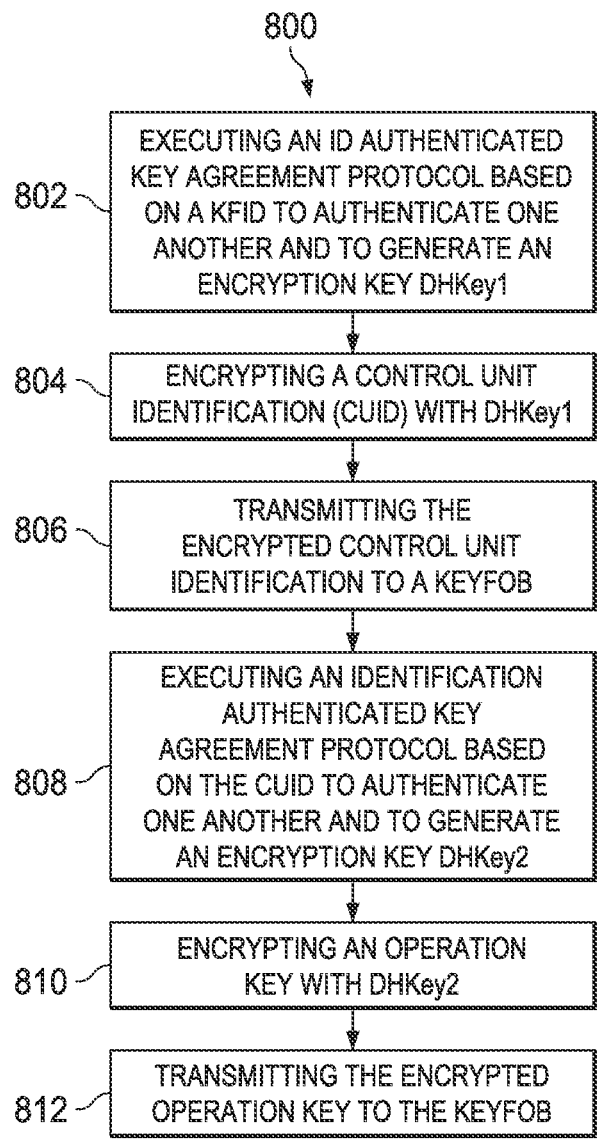
FIG. 8 is an example flow diagram of a method for the ID-based authentication in accordance with various examples discussed herein.

FIG. 6 shows an example normal operation of a paired key fob and CU in accordance with various examples as discussed herein. The normal operation depicted in FIG. 9 shows the interaction between a key fob 106 and a CU 104 post initial pairing by the process 200 (ID-based). The key fob and CU, when communicating with one another upon a user's interaction with the key fob for example, may first authenticate one another by executing an OpKey authenticated challenge-response protocol based on AES-128, for example. Operation of the CU by the key fob may only be allowed when the response is valid. An invalid response may signify a rogue key fob and the CU may not perform commands sent from an invalid key fob.

FIG. 5 shows an example of an OpKey change by a CU in accordance with various examples as discussed herein. The CU 104 may change the OpKey when a key fob 206 is misplaced or is stolen. By changing the OpKey, the CU may prevent the missing or stolen key fob 206 from accessing the CU 104. The CU 104 may be initiated by an external signal that a new OpKey is desired. The external signal may come from the owner of the remaining key fob(s) 106 by performing a preset sequence with the key fob and vehicle or the external signal may come from the pairing device 202 of the dealer 112. Upon receiving the external signal, the CU 104 may encrypt a new OpKey using the old OpKey and then transmit the encrypted new OpKey to the remaining key fob(s) 106. After receiving the new OpKey, the old OpKey may be erased by all the Cu 202, 204 and the remaining key fobs 106. Normal operation between the devices may then continue without worry that the rogue key fob may interact with the CU.

FIG. 12 is an example flow diagram of a method 900B for the ID-based authentication in accordance with various examples discussed herein. The method 900B may be one implementation of the initial pairing process 200 described in regards to FIG. 5. The method 900B begins at step 922 with the pairing device 202 and the key fob 106 executing a KFID authenticated key agreement protocol to authenticate one another and to generate an encryption key DHKey1. The step 924 continues the method 900B with the pairing device 202 encrypting the CUID of the CU 104 with the DHKey1 before the pairing device, at step 926, continues with transmitting the encrypted CUID to the key fob 106.

The method 900B continues at step 928 with the key fob 106 and the CU 104 executing a CUID authenticated key agreement protocol to authenticate one another and to generate an encryption key DHKey2. The method 900B then ends with steps 930 and 932 with the CU 104 encrypting an OpKey with the DHKey2 and transmitting the encrypted OpKey to the key fob 106. After the OpKey has been shared with the key fob 106, the CU 104 and the key fob 106 may be considered paired.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A key fob-control unit pairing device, comprising:
   a transceiver to transmit and receive signals;
   a memory to store a key fob identification (KFID) and a control unit identification (CUID); and
   a processor coupled to said transceiver and memory to:
      perform an identification (ID) authenticated key agreement protocol based on the KFID to generate a common secret encryption key shared between the key fob and the pairing device;
      authenticate the key fob by generating an encrypted CUID using the common secret encryption key generated from the identification (ID) authenticated key agreement protocol; and
      transmit the encrypted CUID to the key fob.

2. The device of claim 1, wherein the ID authenticated key agreement protocol is based on elliptical curve cryptography.

3. The device of claim 1, wherein the ID authenticated key agreement protocol is based on Diffie-Hellman key agreement protocols.

4. The device of claim 1, wherein the KFID and the CUID are eight character hexadecimal words.

5. The device of claim 1, wherein the KFID is used as a password for authentication.

6. The device of claim 1, wherein the KFID is received by the processor via the transceiver from the key fob.

* * * * *